United States Patent
Kim et al.

(10) Patent No.: US 6,868,112 B2
(45) Date of Patent: Mar. 15, 2005

(54) APPARATUS AND METHOD FOR DETECTING SIGNALS OF SPACE-TIME CODING BASED ON TRANSMISSION DIVERSITY

(75) Inventors: Yeon-Soo Kim, Seoul (KR); Young-Hee Shin, Seoul (KR); Joon-Ho Lee, Seoul (KR)

(73) Assignee: Korea Telecom (KR)

( * ) Notice: Subject to any disclaimer, the term of this patent is extended or adjusted under 35 U.S.C. 154(b) by 697 days.

(21) Appl. No.: 09/752,670

(22) Filed: Dec. 28, 2000

(65) Prior Publication Data

US 2002/0101908 A1 Aug. 1, 2002

(30) Foreign Application Priority Data

Dec. 1, 2000 (KR) ........................................ 2000-72277

(51) Int. Cl.[7] .................................................. H04B 1/69
(52) U.S. Cl. ........................ 375/147; 375/267; 375/342; 370/204; 370/470; 370/342
(58) Field of Search ............................... 375/147, 267, 375/342, 143, 221, 219; 370/204, 470, 342

(56) References Cited

U.S. PATENT DOCUMENTS

| | | | |
|---|---|---|---|
| 5,097,484 A | * | 3/1992 | Akaiwa ...................... 375/267 |
| 5,852,630 A | * | 12/1998 | Langberg et al. ........... 375/219 |
| 6,259,724 B1 | * | 7/2001 | Esmailzadeh ............... 375/143 |
| 6,700,926 B1 | * | 3/2004 | Heikkila et al. ............ 375/221 |

OTHER PUBLICATIONS

Boariu, Decoder, and Associated Method, For Decoding Space-Time Encoded Data, Pub. No.: US 2003/0031276 A1.*

* cited by examiner

*Primary Examiner*—Shuwang Liu
*Assistant Examiner*—Eva Zheng
(74) *Attorney, Agent, or Firm*—Blakely Sokoloff Taylor & Zafman

(57) ABSTRACT

An apparatus for detecting the signals of transmission diversity based on space-time coding is disclosed. The apparatus and method for detecting signals of space-time coding performs linear interpolation and linear filtering to calculate the channel estimate of each transmission symbol from the channel estimate of each slot, thus providing the correct channel estimate even in a channel with considerable fluctuation. Further, the output control with estimation of SIR only passes a proper output of the demodulating and detecting circuit to improve the signal to noise ratio, maintaining enough communication quality even in a bad communication environment.

7 Claims, 4 Drawing Sheets

APPARATUS AND METHOD FOR DETECTING SIGNALS OF SPACE-TIME CODING BASED ON TRANSMISSION DIVERSITY

FIELD OF THE INVENTION

The present invention relates to an apparatus and method for detecting signals of space-time coding based on transmission diversity, and more particularly an apparatus and method for detecting signals of space-time coding based on transmission diversity, which linearly filter received signals to estimate the average channel gain of each symbol, measure a signal to interference ratio (SIR), and control the decoded output by comparing with the threshold value, thereby detecting correct symbols.

DESCRIPTION OF THE PRIOR ART

The multi-path fading occurring in most mobile communication channels serves as the main cause of impeding effective and reliable data transmission. The effect of such fading may be mitigated by the space or antenna diversity. The space diversity method is generally used in the base station, employing the Maximal Ratio Combining receiver to process the signals received through several antennas. However, such space diversity method is not practical for a mobile station because of its cost, size, power consumption, etc. Hence, the next generation mobile communications system such as IMT-2000 employs transmission diversity method to cope with the multi-path fading of the downward link.

The transmission diversity method involves multiple transmission antennas and a single reception antenna, compared to the space diversity method involving a single transmission antenna and multiple reception antenna. In this case, the received signal is a linear combination of the signals transmitted from all the transmission antennas. Hence, the receiving system must distinguish the signals received from each of the transmission antenna in order to correctly recover the originally transmitted signals. For such transmission diversity, the space-time coding is used in both the procedure for data transmission at the base station and the procedure for data detection at the mobile station.

The conventional transmission diversity system is schematically shown in FIGS. 1A and 1B for respectively illustrating the transmission system of the base station and the receiving system of the mobile station. The transmission system includes a QPSK (Quadrature Phase Shift Keying) modulator 110, space-time encoder 120, and spreading code generator 130 as shown in FIG. 1A, and the receiving system including a receiving circuit 140, QPSK demodulator 150, etc.

In this case, the transmission data are channel-encoded information bits, which are processed through the QPSK modulator 110 and the space-time encoder 120 to produce the transmission symbol sequence spread by the same diversity code.

The QPSK modulator 110 maps the input bit sequence through series to parallel transformation into the QPSK symbols with the in-phase component I and the quadrature phase component Q. The QPSK signal is made by the I and Q components to take one of the four phases, i.e., $\pm\pi/4$ and $\pm 3\pi/4$, thereby appearing as a complex number.

Input of the space-time encoder 120 is the data symbol pair. The coding is based on orthogonal structure for the receiving circuit 140 to separate the signals transmitted from other antennas, performed for two symbol intervals. Assuming that a pair of transmitted symbols is $S_1$ and $S_2$, the output of the space-time coding is expressed by Equation (1):

$$\begin{bmatrix} S_1 & S_2 \\ -S_2^* & S_1^* \end{bmatrix} \quad (1)$$

If the symbol of the space-time coding matrix is termed as $S_t^m$, the symbols of the column are simultaneously transmitted from the transmission antenna at time t. Hence, the transmission matrix represents the symbol group transmitted over two symbol intervals through two transmission antennas, where the symbols $S_1$ and $-S_2^*$ are transmitted at t=T, and the symbols $S_2$ and $S_1^*$ at t=2T. The receiving circuit simultaneously receives signals from all the transmission antennas as the combination of the signals through all channels.

If the first and second transmission antennas are separated enough to not affect each other, the radio channel from the first transmission antenna to the reception antenna is different from the radio channel from the second transmission antenna to the reception antenna, so that the signal transmitted at time t=T is received by the receiving circuit, being different from time t=T+$\Delta$t to time t=2T+$\Delta$t as expressed by Equation (2).

$$y_1 = \alpha_1 S_1 - \alpha_2 S_2^* + n_1$$
$$y_2 = \alpha_1 S_2 - \alpha_2 S_1^* + n_2 \quad (2)$$

Wherein $\alpha_1$ and $\alpha_2$ represent respectively the path gains from the first and second transmission antennas to thereception antenna, having different magnitudes and phases. In addition, $n_1$ and $n_2$ represents background noises, and the superscription * complex conjugate.

The path gain causes a distortion to the transmission signal, which should be compensated to detect the original transmission symbol. The compensation may be achieved by using the channel estimate obtained by the channel estimation process as described hereinafter. Hence, using the perfect channel estimate, the symbols $\hat{S}_1$ and $\hat{S}_2$ are expressed by Equation (3).

$$\begin{bmatrix} \hat{s}_1 \\ \hat{s}_2 \end{bmatrix} = \begin{bmatrix} \hat{\alpha}_1^* & \hat{\alpha}_2 \\ -\hat{\alpha}_2^* & \hat{\alpha}_1 \end{bmatrix} \begin{bmatrix} y_1 \\ y_2^* \end{bmatrix} \quad (3)$$

Wherein $\hat{\alpha}_1$ represents an estimate of the channel gain $\alpha_1$, and * the complex conjugate.

In the system of FIGS. 1A and 1B, the pilot symbol is periodically transmitted to each antenna, so that the receiving circuit may use it to estimate the channel.

FIG. 2 schematically shows the structure of the transmission frame in which the pilot symbol is inserted. As shown in FIG. 2, the transmission frame symbol consists of 15 slots, each of which in turn consists of a data field for the data symbol sequence and a pilot field for the pilot symbol pattern.

In the transmission frame transmitted through the first antenna, the data field which contains the space-time encoded transmission symbol generated from the space-time encoder, and the pilot field which contains the pilot symbol separately defined for each antenna are time-multipelxed. Meanwhile, in the transmission frame transmitted through the second antenna, the data field which contains the space-time encoded symbol and the pilot field which contains the pilot symbol orthogonal to that of the first antenna are also time-multiplexed. The pilot time-multiplexed for each slot have an inherent pattern (i, j), where (i, j) representing the pilot pattern transmitted from the ith antenna to the jth slot includes "p" symbols. The pilot (1, j) is orthogonal to the pilot (2, j).

Referring to FIG. 3 illustrating the conventional apparatus for detecting transmission diversity signals, the space-time encoded symbols are detected by a number L of demodulating and detecting circuits 300_a, . . . , 300_1, and a combiner 340. Each demodulating and detecting circuit 300 includes a correlator 310, channel estimator 320, and space-time decoder 330. In order to detect the transmission diversity signals, two consecutive transmission symbols are first demodulated by the correlating circuit 310 using the spreading code that is the same as that of the transmission system. The data symbol outputted from the demodulating and detecting circuit 300 is detected by the space-time decoder 330 from the channel estimate and decoded signal. The channel estimate represents the channel gain estimated by the channel determiner from the received pilot symbol. The outputs of all the demodulating and detecting circuits 300 corresponding to the receiving paths are linearly combined through the combiner 340 to provide the originally transmitted data symbol.

The space-time encoded signal is very sensitively affected by channel estimation error, so that the two-stage channel estimation is generally used to obtain the correct channel estimate. The first stage is the procedure of receiving and filtering the pilot symbol. Since the pilot symbol pattern is already known to the receiving system, the channel gain during the pilot symbol interval of a channel may be estimated by using the corresponding pilot symbol received as follows.

For example, if the pilot symbol patterns for the first and second antennas in the first slot are respectively A A A A* and A −A −A A*, they are orthogonal to each other, wherein A=−1−i. Then, if the symbols of the patterns are sequentially transmitted one by one through the radio channels with the respective path gains, the received pilot symbols are expressed by the matrix of Equation (4).

$$\begin{bmatrix} r_1 \\ r_2 \\ r_3 \\ r_4 \end{bmatrix} = \begin{bmatrix} A & A \\ A & -A \\ A & -A \\ A^* & A^* \end{bmatrix} \begin{bmatrix} a_1 \\ a_2 \end{bmatrix} + n \quad (4)$$

Wherein n represents the background noise. This pilot symbol matrix gives the orthogonal matrix expressed by Equation (5), so that the channel gain may be estimated by Equation (6).

$$\begin{bmatrix} A^* & A^* & A^* & A \\ A^* & -A^* & -A^* & A \end{bmatrix} \begin{bmatrix} A & A \\ A & -A \\ A & -A \\ A^* & A^* \end{bmatrix} = \begin{bmatrix} 4AA^* & 0 \\ 0 & 4AA^* \end{bmatrix} \quad (5)$$

$$\begin{bmatrix} a_1 \\ a_2 \end{bmatrix} = \begin{bmatrix} A^* & A^* & A^* & A \\ A^* & -A^* & -A^* & A \end{bmatrix} \begin{bmatrix} r_1 \\ r_2 \\ r_3 \\ r_4 \end{bmatrix} \quad (6)$$

The gain per a symbol is obtained by normalizing with 4AA* because the estimated channel gain represents the entire gain considering the four symbol intervals.

The second stage is a procedure of obtaining a weighted average of the channel estimates of several slots. For example, assuming that the weight values used are $\omega_0$ and $\omega_1$, and the channel estimate of the pilot symbol of an arbitrary nth slot $\alpha(n)$, the channel estimate of the nth slot is expressed by Equation (7).

$$\hat{\alpha}(n) = \begin{bmatrix} w_1 \\ w_0 \\ w_0 \\ w_1 \end{bmatrix} \begin{bmatrix} \alpha_{(n-2)} \\ \alpha_{(n-1)} \\ \alpha_{(n)} \\ \alpha_{(n+1)} \end{bmatrix} \quad (7)$$

Equation (7) is applied to each slot interval in the same manner, and therefore the channel estimate is the same in one slot interval. This procedure is substantially to filter the estimate of the first procedure and effectively give more correct channel estimate than the first procedure. The channel estimate thus obtained may be desirably used to precisely detect the data symbol of each slot. In this case, the above matrix obtained during the channel estimation is always the same regardless of the number of the transmission antenna employed.

However, such reception of the space-time encoded symbol only provides the channel estimate of one sample for one slot despite the weighted average, so that the fast fading channel not only makes it difficult to precisely estimate the channel gain varying in the slot interval, but also the use of the inexact channel estimate may further distort all the data of a slot in the environment of great noises and interferences with a number of mobile stations.

Moreover, the combination of the outputs of all the decoders without considering the reception level results in the combination of the decoders' outputs lower than the threshold value, and degrade the performance of the receiving system of the space-time encoded symbol due to the reduction of the signal to noise power ratio of the detected symbol.

SUMMARY OF THE INVENTION

It is an object of the present invention to provide an apparatus for detecting signals of a space-time coding based on a transmission diversity, which linearly filters the received signals to estimate the average channel gain of each symbol, measure SIR, and control the decoded output by comparing with the threshold value, thereby detecting a correct symbol, a method thereof, and a computer readable recording medium to perform the method.

In Accordance with an aspect of the present invention, there is provided an apparatus for detecting the signals of space-time coding based on transmission diversity, comprises a plurality of correlators for subjecting received signals to despreading with the same spreading code as the spreading code used in the transmission side to obtain the transmission symbols, a plurality of channel estimator for obtaining the channel estimates of the slots from the transmission symbols of the pilot symbol intervals from the correlators to determine the average channel estimate of each symbol through linear interpolation and filtering of the channel estimates, a plurality of space-time decoders for decoding the transmission symbols received from the correlators based on the channel estimates of the channel estimator to detect the data symbols, a plurality of output control devices for comparing the average signal strength and interference of each slot of the received signals with the threshold value to control the output of the data symbol detected by the space-time decoders, and a combiner for linearly combining the detected signals of the space-time decoders multiplied by the control signals of the output control devices.

In accordance with another aspect of the present invention, there is a provided a method for detecting the signals of space-time coding based on transmission diversity, comprises the steps of subjecting received signals to de-spreading by the same spreading code as the spreading code used in the transmission side to obtain the transmission symbols decoded, obtaining the channel estimates of the slots from the decoded transmission symbols to determine the average channel estimate of each symbol through linear interpolation and filtering of the channel estimates, decoding the transmission symbols based on the channel estimates to detect the data symbols, comparing the average signal strength and interference of each slot of the received signals with the threshold value to control the output of the decoded data symbols, and linearly combining the controlled data symbols.

In accordance with still another embodiment of the present invention, there is provided a computer readable recording medium to perform a method of detecting the signals of space-time coding based on transmission diversity, which comprises the steps of subjecting received signals to de-spreading with the same spreading code as the spreading code used in the transmission side to obtain the transmission symbols decoded, obtaining the channel estimates of the slots according to the decoded transmission symbols to determine the average channel estimate of each symbol through linear interpolation and filtering of the channel estimates, decoding the transmission symbols based on the channel estimates to detect the data symbols, comparing the average signal strength and interference of each slot of the received signals with the threshold value to control the output of the decoded data symbols, and linearly combining the controlled data symbols.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

Figure 1A:
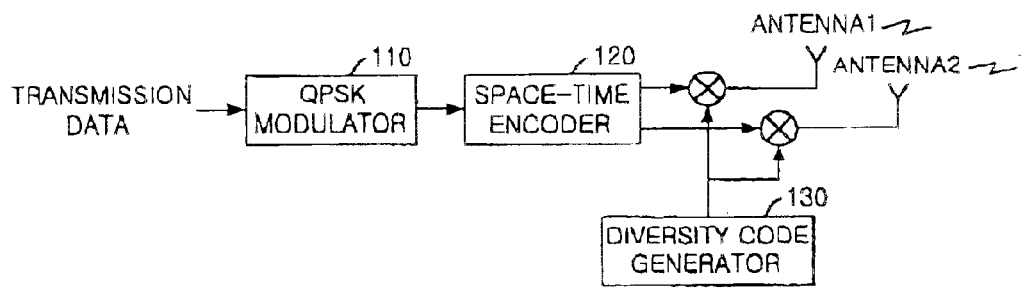
FIGS. 1A and 1B are block diagrams for illustrating a conventional system for applying the transmission diversity.
Figure 1B:
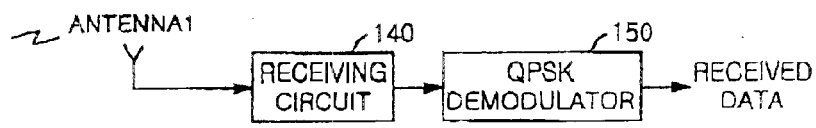
Figure 2:
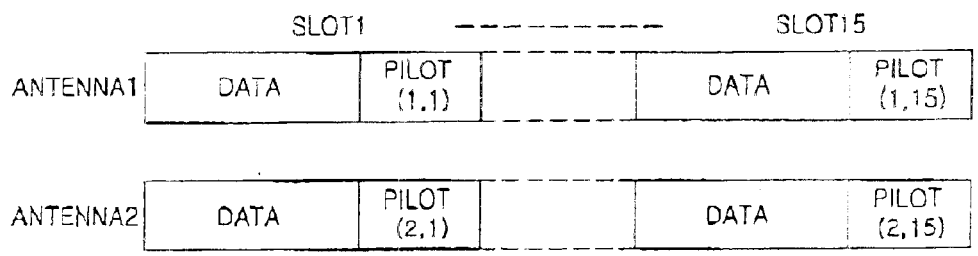
FIG. 2 is an example of the frame structure of the transmission symbol having the conventional pilot symbol inserted.
Figure 3:
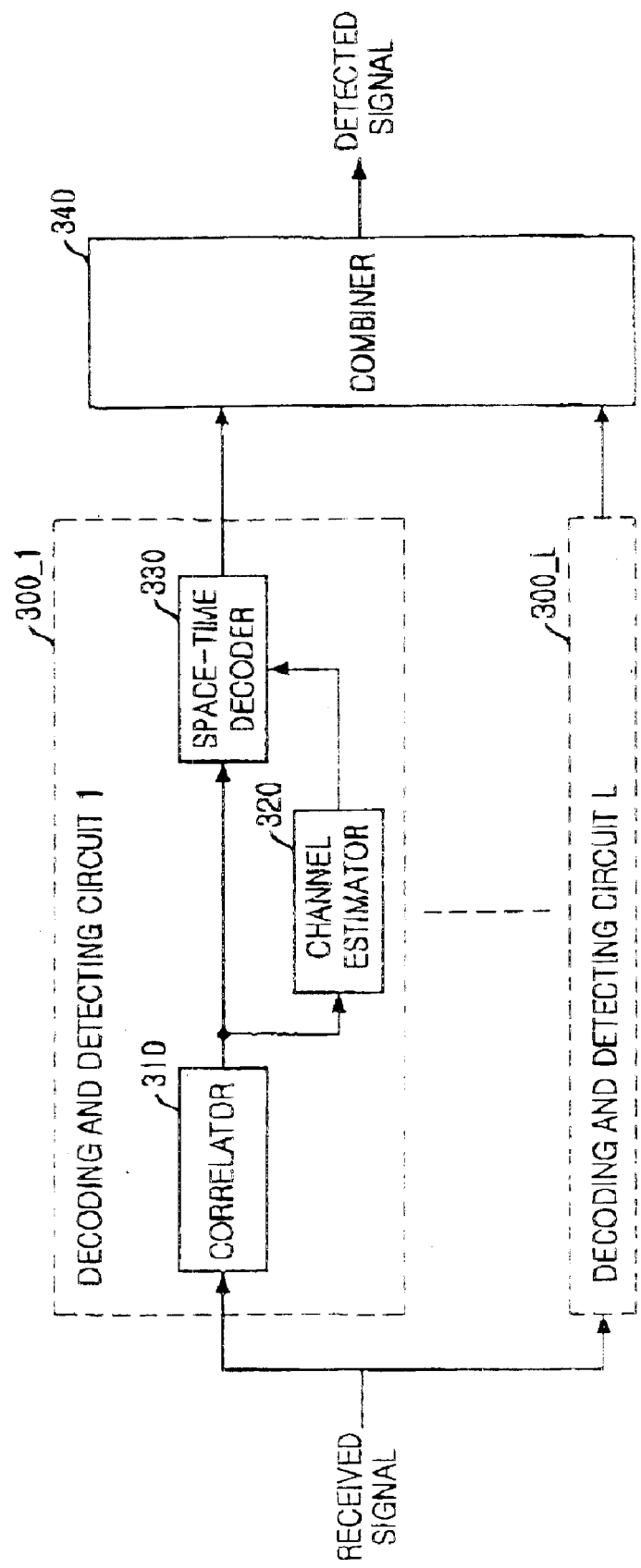
FIG. 3 is a block diagram for illustrating the structure of the conventional system for detecting the signals of space-time coding.
Figure 4:
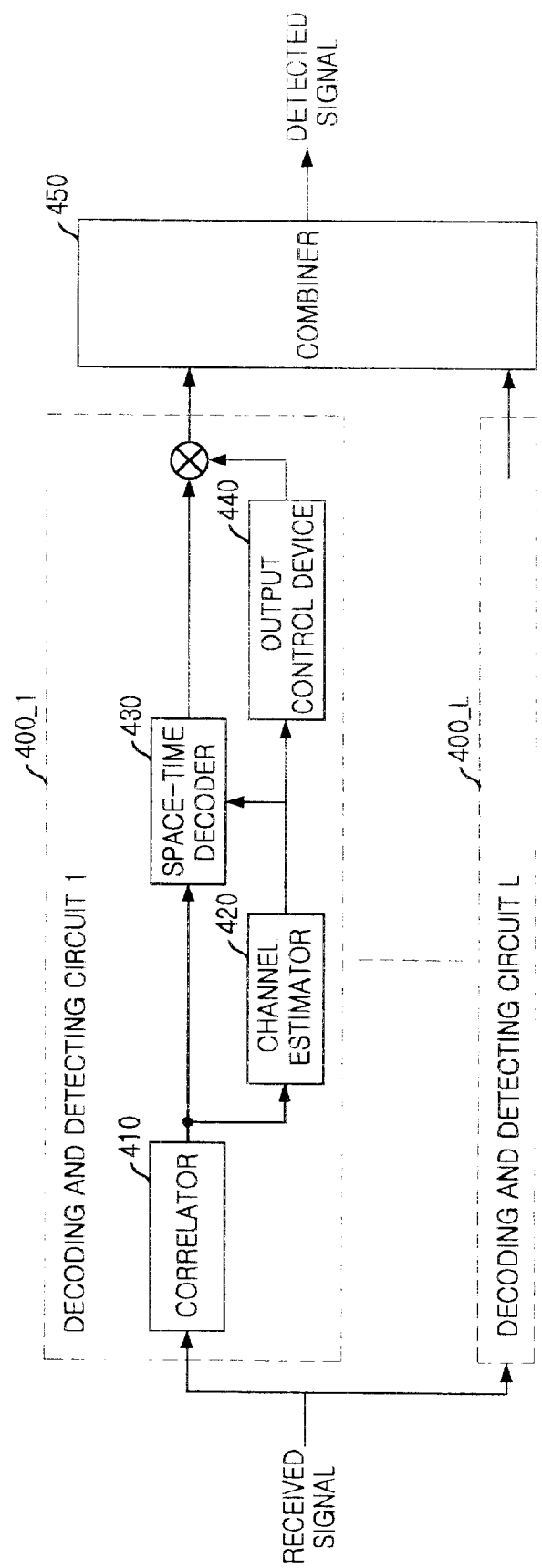
FIG. 4 is a block diagram for illustrating the structure of the inventive system for detecting the signals of space-time coding.

Referring to FIG. 4, the inventive system is provided with an improved channel estimator and output control device in addition to the conventional system for detecting the signals of space-time coding based on the transmission diversity. The system includes a number L of demodulating and detecting circuits 400_1, . . . , 400_L for decoding the signals of respective signal paths to detect data symbols, and a combiner 450 for linearly combining the detected signals from the demodulating and detecting circuit 400.

Each of the demodulating and detecting circuits 400_1, . . . , 400_L includes a correlator 410 for decoding the received signal into the transmission symbol, channel estimator 420 for calculating the channel estimate, space-time decoder 430 for decoding the space-time coding, and output control device 440 for controlling the output signal delivered to the combiner 450. The signal passing the corresponding signal path is subjected to code synchronization during decoding of the data symbol. In the drawing, $\otimes$ represents a multiplier for multiplying the two inputs.

More specifically describing the structural elements, the correlator 410 subjects the received signal to de-spreading with the same spreading code as the spreading code used in the transmission side to obtain the transmission symbol decoded. The channel esitmator 420 obtains the channel estimate of the slot according to the transmission symbol of the pilot symbol interval from the correlator 410 to determine the average channel estimate of each symbol through linear interpolation and filtering of the channel estimate. The space-time decoder 430 decodes the data symbol received from the correlator based on the channel estimate of the channel estimator 420 to detect the data symbol. The output control device 440 compares the average signal strength and interference of the slot of the received signal with the threshold value to control the output of the data symbol detected by the space-time decoder 430. The combiner 450 linearly combines the L detected signals of the space-time decoders 430 multiplied by the L control signals of the output control devices 440.

The channel estimator 440 further includes a slot channel estimator for filtering the pilot symbol to estimate the channel gain, and obtaining the weighted average of the channel estimates of several slots to produce the channel estimate of the slot through a linear interpolation circuit for subjecting the channel estimate from the slot channel estimator to linear interpolation to produce the channel estimate of each transmission symbol, and a linear filtering circuit for obtaining the average of the channel estimates of the symbols extracted by the linear interpolation circuit for a given interval to produce the average channel estimate of the transmission symbol.

The output control device further includes an SIR estimator for estimating SIR based on the instantaneous signal power and average interference power of the corresponding slot measured from the channel estimate and decoded data symbols of one slot interval, a signal comparison circuit for comparing the SIR estimated by the SIR estimator with a given threshold value to judge whether the corresponding output signal is approved, and an output controller for controlling the output according to the decoded symbol multiplied by the result of the signal comparison circuit.

Describing the steps of receiving the signal of space-time coding, the correlator 410 subjects the signal to de-spreading with the same diversity code as the spreading code used in the transmission system to obtain the transmission symbol decoded. The output of the correlator 410 is delivered to the space-time decoder 430 or the channel estimator 420 according to a kind of the transmission symbol. Namely, it is delivered to the channel estimator 420 in the pilot symbol interval, or to the space-time decoder 430 in the data symbol interval.

The space-time decoder 430 decodes the detected transmission symbol based on its channel estimate to detect the data symbol of the corresponding demodulating and detecting circuit 400. The channel estimate is the output of the channel estimator 420 having the first and second estimation stages.

The output control device 440 estimates SIR of the slot from the detected data symbols and channel estimates to control the data symbols of the slot delivered to the combiner 450. The combiner 450 linearly combines the outputs of all the demodulating and detecting circuits to produce the received data symbols with maximum energy.

Among the structural elements of the receiving system, the operations of the correlator 410, the space-time decoder 430, and the combiner are the same as those of the conventional receiving system, except the channel estimator 420 and output control device 440.

The correlator of the receiving system decodes the two transmission symbols continuously transmitted with the same spreading code as the code used in and synchronized with the transmission side. The data symbol that is the output of the demodulating and detecting circuit 400 is detected by the space-time decoder 430 from the channel estimate and decoded data. The channel estimate is produced by the channel estimator 420. All the outputs of the demodulating and detecting circuits 400 corresponding to the number of the signal paths are linearly combined through the combiner 450 to recover the original data symbols.

The channel estimator 420 estimates the channel gain of the symbol in addition to the conventional estimation of the channel gain of the slot. The procedure of estimating the channel gain of the symbol includes the steps of linear interpolation and linear filtering to calculate the correct channel estimate of each symbol from the channel estimate of the slot.

The linear interpolation is the procedure of calculating the channel estimate of each symbol from the channel estimate of the slot. The interpolation function for this is a function of the channel estimate of the slot. The coefficient of the interpolation function is determined by the function of the order of the transmission symbols in the slot, defined as 2Ns. Assuming the channel estimate of the nth slot is h(n), the channel estimate h(n, k) of the k-th data symbol of the targeted n-th slot is determined by Equation (8).

$$h(n,k) = C_0(n,k)h(n-1) + C_1(n,k)h(n) \quad (8)$$

Wherein the coefficient is expressed by Equation (9), where $N_s$ represent the number of the data symbols contained in one slot.

$$C_0(n,k) = \frac{N_s - k}{N_s}, \quad C_1(n,k) = \frac{k}{N_s} \quad (9)$$

Equation (8) puts more weight on the channel estimate of the previous slot in the leading half of the slot, while more weight on the channel estimate of the present slot in the trailing half of the slot, in estimating the channel gain of the symbol.

According to the above linear interpolation, the channel gain is estimated adaptively varied from the previous slot to the present slot, so that it is effective to estimate the channel gain for each symbol in the slot.

The linear filtering is the procedure of obtaining the average of the channel estimates of the symbols obtained by the linear interpolation over a given interval. The linear interpolation employs the channel estimates of the slot containing noises and interferences, so that the channel estimates of the symbols also contain interferences and noises. Hence, the linear filtering is the procedure of eliminating the noises and interferences contained therein to provide more correct channel estimates.

This is based on the principle that the weighted average of both the present input and previous output is defined as the present output which employs for the average channel estimate of the present symbol the channel estimate h(n, k) of the present symbol and the average channel estimate ĥ(n,k−1). Thus, the average channel estimate of each symbol is repeatedly produced by Equation (10) in the linear filtering.

$$\hat{h}(n,k) = \beta \hat{h}(n, k-1) + (1-\beta)h(n,k) \quad (10)$$

Wherein $\beta$ is a coefficient limiting the detection interval, that is, the accumulated number of the channel estimates of the symbols used in the average, which is set to have a value less than 1, determining the performance of the linear filtering. If $\beta$ approaches 1, the linear filter may fully removes the noises, but does not sufficiently follow the signal level varied. On the contrary, if it is much less than 1, the linear filter may delicately follow the signal level, but does not sufficiently remove the noises, so that it is hardly possible to improve the signal to noise ratio. Hence, a proper value should be selected for the optimum performance considering the operating environment and system.

The output control device 440 controls the output of the demodulating and detecting circuit 400 according to SIR measured of the present slot. The estimation of SIR is achieved by the direct ratio of the instantaneous signal power and average interference power of the corresponding slot detected.

The instantaneous signal power is measured based on the pilot symbol of the previous slot and the data symbol of the present slot. As the pilot symbol of the previous slot may be used the one detected in estimating the channel gain of the slot by the channel determiner 420. In addition, the power of the data symbol of the present slot is measured based on direct judgment of the output of each demodulating and detecting circuit. The direct judgment is to map the output of the demodulating and detecting circuit onto the data symbol of the complex value. Accordingly, the real and imaginary parts of the output are judged as '1' when greater than '0', and '−1' when less than '0'.

In addition, the output of the demodulating and detecting circuit is re-coded according to the result of the direct judgment obtained as ±1±j. Namely, the common component of the temporarily decoded data symbol is multiplied by the output of the demodulating and detecting circuit. Accordingly, assuming the output of the demodulating and detecting circuit corresponding to the kth data symbol of the nth slot and the result of its direct judgment are respectively r(n, k) and $d_s$(n, k), the size component of the data symbol is the re-coded signal expressed by Equation (11), and the average of the receiving signal in the nth slot interval is expressed by Equation (12).

$$\hat{r}(n,k) = r(n,k)d_s^*(n,k) \quad (11)$$

$$S(n) = \frac{1}{2}\left|h(n-1)h^*(n-1) + \frac{1}{N_S}\sum_{k=1}^{N_S}\hat{r}(n,k)\right|^2 \qquad (12)$$

Wherein h(n−1) represents the channel estimate of the (n−1)-th slot.

The average interference power may be relatively easily calculated by using the re-modulated signal, i.e., the signal strength of the received data symbol and the instantaneous signal power. Firstly, the reception power of the data symbol is calculated by square operation of each re-coded signal and then average those values over $N_s$ interval. In this case, the reception power of the data symbol consists of the average reception power of the data symbol and the instantaneous interference power, so that the instantaneous interference power of the data symbol is obtained directly from it, and the result provides the instantaneous interference power of the nth slot as expressed by Equation (13).

$$I(n) = \frac{1}{N_S}\sum_{k=1}^{N_S}|\hat{r}(n,k)|^2 - S(n) \qquad (13)$$

Moreover, the average of the interference powers is calculated based on the weighted average of the instantaneous interference power and the previous average interference power. To this end, the linear filter may be used as in the procedure of estimating the channel gain of the symbol by the channel estimator 420. Thus, the average interference power of the nth slot is expressed by Equation (14).

$$\hat{I}(n) = \beta \hat{I}(n) + (1-\beta)I(n) \qquad (14)$$

In this case, a proper value must also be assigned to β as described in connection with the channel estimator 420. Hence, the estimation of SIR is expressed by Equation (15) based on the instantaneous signal power and the average interference power obtained through the above procedure.

$$SIR_{est} = S(n)/\hat{I}(n) \qquad (15)$$

The output control consists of the steps of determining the weight value for the output control by comparing $SIR_{est}$ with a predetermined threshold value $SIR_{th}$, and multiplying the output of the demodulating and detecting circuit by the weight value. In this case, if $SIR_{est}$ is greater than $SIR_{th}$, the weight value is set to 1, or otherwise to 0.

The weight value is used to open or close the output of the demodulating and detecting circuit delivered to the input of the combiner 450. Namely, the output of the demodulating and detecting circuit is closed with less SIR while the output with more SIR is used by the combiner to detect the data symbol. Thus, the output control by SIR may prevent the degraded output of the demodulating and detecting circuit from entering the combiner 450, so that it is possible to significantly increase the signal to noise ratio of the output of the combiner, i.e., the detected data symbol. In this case, the threshold value is selected so as to achieve the best performance of the receiving system.

Thus, the inventive demodulating and detecting circuit for the mobile station estimates the average channel gain of each symbol through linear filtering, and controls the output by comparing the measured SIR with the threshold value, so as to detect the correct symbol data despite considerable variation and interference of the received signal level.

Figure 5:
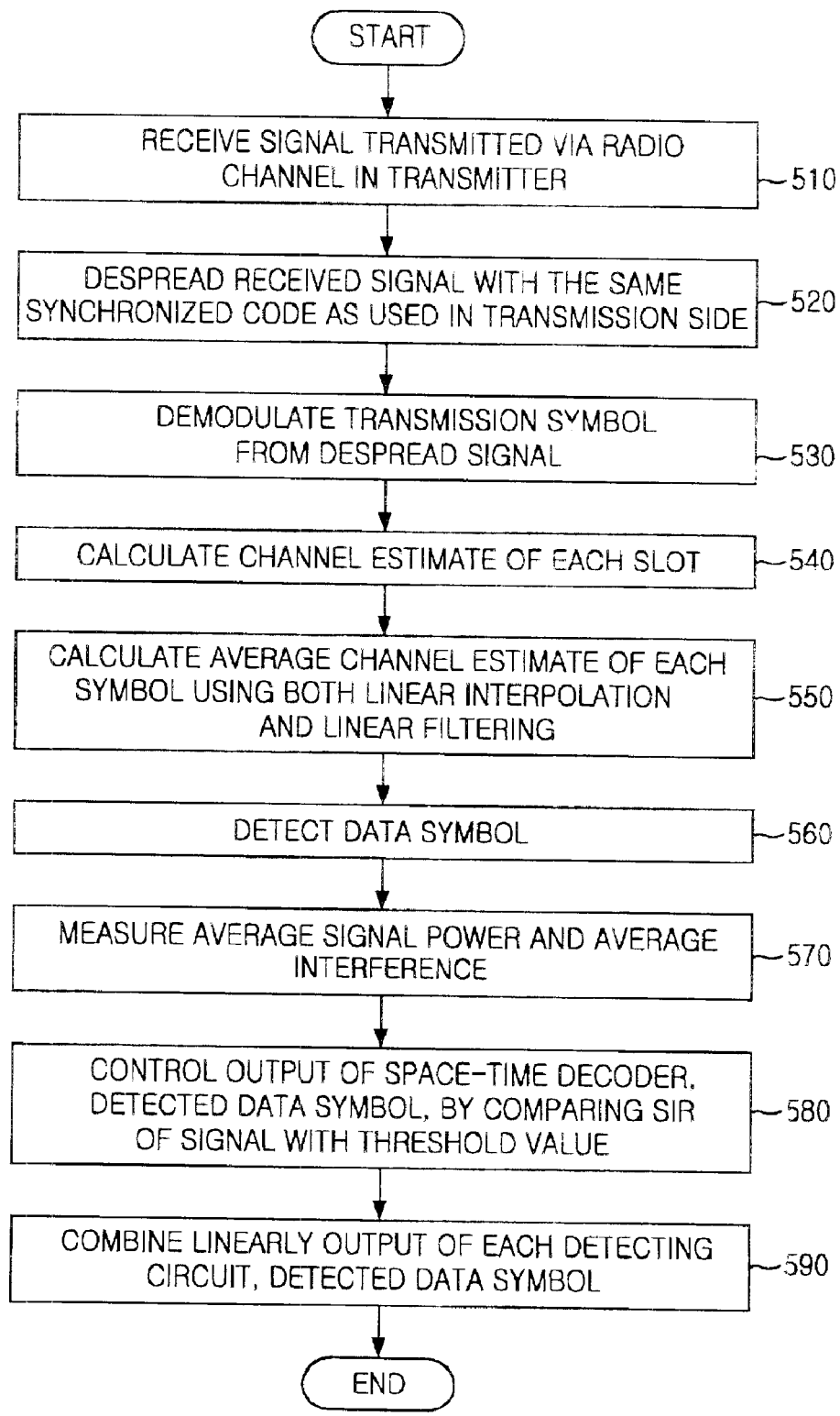
FIG. 5 is a flow chart for illustrating the process of detecting the space-time encoded signal according to the present invention.

Describing more specifically the steps of detecting the signals of space-time coding in connection with FIG. 5, the signal transmitted via the radio channel is received at step 510. The received signal is de-spread at step 520 with the same spreading code as the spreading code used in the transmission side to obtain the transmission symbols decoded at step 530. The channel estimate of the slot is calculated from the decoded transmission symbol at step 540.

At step 550, the channel estimate of the slot is subjected to linear interpolation to obtain the channel estimate of each transmission symbol, which is in turn subjected to linear filtering to obtain the average channel estimate measured over a given interval. At step 560, the data symbol is detected at step 560 based on the transmission symbol decoded at step 530 and the channel estimate obtained at step 550. The average signal and average interference of each slot are measured to obtain SIR at step 570. The SIR is compared with a given threshold value at step 580 to judge whether the output signal of the corresponding demodulating and detecting circuit is proper, so that the result of the judgment is used as the weight value multiplied with the decoded symbol to control the output of the demodulating and detecting circuit. Finally, the symbols detected and decoded by the demodulating and detecting circuit are linearly combined to produce the output at step 590. All these steps may be programmed by a computer into a recording medium such as a CD-ROM, a RAM, a ROM, a floppy disk, a hard disk, an optical magnetic disk, etc. so as to be retrieved as desired.

Thus, the inventive method employs linear interpolation and linear filtering to calculate the channel estimate of each transmission symbol from the channel estimate of each slot, thus providing the correct channel estimate even in a channel with considerable fluctuation. Further, the output control with estimation of SIR only passes a proper output of the demodulating and detecting circuit to improve the signal to noise ratio, maintaining enough communication quality even in a bad communication environment.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. An apparatus for detecting signals of space-time coding based on transmission diversity, comprising:

a plurality of correlators for subjecting received signals to de-spread with the same spreading code as a spreading code used in the transmission side to obtain transmission symbols decoded;

a plurality of channel estimators for obtaining channel estimates of slots according to the transmission symbols of pilot symbol intervals from said correlators to determine an average channel estimate of each symbol through linear interpolation and filtering of the channel estimates;

a plurality of space-time decoders for decoding the transmission symbols of two data symbol intervals received from said correlators based on the channel estimates of said channel estimator to detect the data symbols;

a plurality of output control devices for comparing an average signal strength and interference of each slot of the received signals with a threshold value to control output of the data symbol detected by said space-time decoders; and a combiner for linearly combining the detected signals of said space-time decoders multiplied by the control signals of said output control devices, wherein each of said channel estimator of the plurality of channel estimators includes:

a slot channel estimator for filtering a pilot symbol to estimate a channel gain, and obtaining a weighted average of the channel estimates of several slots in order to produce a channel estimate of the slot;

a linear interpolation circuit for subjecting the channel estimate from the slot channel estimator to linear interpolation to produce a channel estimate of each transmission symbol; and a linear filtering circuit for obtaining an average of the channel estimates of the symbols extracted by the linear interpolation circuit for a given interval in order to produce an average channel estimate of the transmission symbol.

2. The apparatus as recited in claim 1, wherein the linear filtering circuit reduces the noises contained in the channel estimate extracted by the linear interpolation circuit.

3. The apparatus as recited in claim 2, wherein each of said output control devices includes:

an SIR (Signal to Interference Ratio) estimator for estimating SIR based on an instantaneous signal power and average interference power of the corresponding slot measured from the channel estimate and decoded data symbols of one slot interval;

a signal comparison circuit for comparing the SIR estimated by said SIR estimator with a given threshold value to judge whether the corresponding output signal is approved; and an output controller for controlling the output according to the decoded symbol multiplied by the result of the signal comparison circuit.

4. A method for detecting signals of space-time coding based on transmission diversity, comprising the steps of:

subjecting received signals to de-spread with the same spread code as used in a transmission side to obtain transmission symbols decoded;

obtaining channel estimates of slots according to the decoded transmission symbols to determine an average channel estimate of each symbol through linear interpolation and filtering of the channel estimates;

compensating the transmission symbols based on the channel estimates to detect the data symbols;

comparing the average signal strength and interference of each slot of said received signals with a threshold value to control an output of the decoded data symbols; and linearly combining the controlled data symbols, wherein the step of obtaining the channel estimates includes the steps of:

filtering a pilot symbol to estimate the channel gain, and obtaining the weighted average of a channel estimates of several slots in order to produce the channel estimate of a slot;

subjecting the channel estimate from said slot channel estimator to linear interpolation to produce a channel estimate of each transmission symbol; and obtaining an average of said channel estimates of the symbols for a given interval in order to produce an average channel estimate of the transmission symbol.

5. The method as recited in claim 4, wherein the step of obtaining the average of the channel estimates reduces the noises contained in the channel estimate.

6. The method as recited in claim 5, wherein the step of comparing the average signal and interference further includes the steps of:

estimating SIR based on the instantaneous signal power and average interference power of the corresponding slot measured from the channel estimate and decoded data symbols of one slot interval;

comparing the SIR estimated by said SIR determiner with a given threshold value to judge whether the corresponding output signal is approved; and controlling the output according to the decoded symbol multiplied by the result of said signal judgment circuit.

7. A computer readable recording medium to perform a method of detecting the signals of transmission diversity based on space-time coding, which comprises the steps of:

subjecting received signals to reverse diversification with the same diversity code as used in a transmission side to obtain the transmission symbols decoded;

obtaining channel estimates of the slots according to the decoded transmission symbols to determine the average channel estimate of each symbol through linear interpolation and filtering of said channel estimates;

decoding transmission symbols based on the channel estimates to detect the data symbols;

comparing an average signal and interference of each slot of said received signals with a threshold value to control output of the decoded data symbols; and linearly combining the controlled data symbols, wherein the step of obtaining the channel estimates includes the steps of:

filtering a pilot symbol to estimate channel gain, and obtaining a weighted average of a channel estimates of several slots in order to produce the channel estimate of a slot;

subjecting the channel estimate from said slot channel estimator to linear interpolation to produce a channel estimate of each transmission symbol; and obtaining an average of said channel estimates of the symbols for a given interval in order to produce an average channel estimate of the transmission symbol.

* * * * *